United States Patent
Yamaguchi et al.

[11] Patent Number: 5,484,536
[45] Date of Patent: Jan. 16, 1996

[54] FILTER BACKWASH CONTROL METHOD AND APPARATUS

[75] Inventors: Shinichi Yamaguchi, Kanagawa; Sachio Doi, Yokosuka, both of Japan

[73] Assignee: Kabushiki Kaisha Toshiba, Kawasaki, Japan

[21] Appl. No.: 272,621

[22] Filed: Jul. 11, 1994

Related U.S. Application Data

[63] Continuation of Ser. No. 945,952, Sep. 17, 1992, abandoned.

[30] Foreign Application Priority Data

Sep. 17, 1991 [JP] Japan .................................. 3-236311

[51] Int. Cl.$^6$ .................................................. B01D 24/46
[52] U.S. Cl. ......................... 210/741; 210/108; 210/149; 210/742; 210/791; 95/15; 95/20
[58] Field of Search ............................. 210/87, 90, 103, 210/108, 149, 275, 277, 333.01, 411, 741, 742, 791, 793, 798, 143, 321.69, 636; 55/274, 242, 302; 95/14, 15, 20, 23, 214

[56] References Cited

U.S. PATENT DOCUMENTS

| | | | |
|---|---|---|---|
| 4,123,356 | 10/1978 | Sugimoto et al. | 210/108 |
| 4,187,175 | 2/1980 | Roberts et al. | 210/108 |
| 4,277,255 | 7/1981 | Apelgren | 95/15 |
| 4,491,458 | 1/1985 | Sunter | 95/20 |
| 4,500,326 | 2/1985 | Sunter | 95/20 |
| 4,692,253 | 9/1987 | Otake et al. | 210/108 |
| 4,772,385 | 9/1988 | Yamada et al. | 210/149 |
| 4,865,627 | 9/1989 | Dewitz et al. | 95/20 |
| 4,876,006 | 10/1989 | Ohkubo et al. | 210/321.69 |
| 4,980,066 | 12/1990 | Slegers | 210/636 |

FOREIGN PATENT DOCUMENTS

| | | | |
|---|---|---|---|
| 126714 | 11/1984 | European Pat. Off. | 210/636 |
| 63-059312 | 3/1988 | Japan | 210/636 |

*Primary Examiner*—Joseph W. Drodge
*Attorney, Agent, or Firm*—Oblon, Spivak, McClelland, Maier & Neustadt

[57] ABSTRACT

A filter medium is backwashed to cleanse it of cake when a fluid pressure difference across the filter medium rises to a predetermined degree. Since the pressure difference is subject to change not only with the amount of the cake but also with the temperature and flow rate of the fluid being filtered, not only the pressure difference but also at least either of the fluid temperature and flow rate is constantly monitored. A correction coefficient circuit is provided which has stored thereon pressure difference characteristics at various temperatures and/or flow rates of the fluid including a pressure difference at a rated temperature and/or rated flow rate. The correction coefficient circuit computes a correction coefficient by comparing the pressure difference characteristic at the monitored temperature and/or monitored flow rate of the fluid with the pressure difference characteristic at the rated temperature and/or rated flow rate of the fluid. A correction circuit corrects the monitored pressure difference by the correction coefficient in order to obtain a pressure difference at the rated temperature and/or rated flow rate. The filter medium is backwashed when the corrected pressure difference rises to a predetermined value.

8 Claims, 8 Drawing Sheets

FILTER BACKWASH CONTROL METHOD AND APPARATUS

This application is a Continuation of application Ser. No. 07/945,952, filed on Sep. 17, 1992, now abandoned.

BACKGROUND OF THE INVENTION

This invention relates generally to filters for the removal of solids from a fluid by directing the fluid through a filter medium, or septum, under pressure. More specifically, the invention pertains to a control method and apparatus for automatically backwashing the filter medium in response to a pressure difference across the same in order to make it free of accumulated solids, or cake. The fluid to be filtered may be liquid or gas, and either the liquid may be valuable, or the solids, or both. The filter according to the invention finds use in nuclear or steam power plants and a variety of other industrial and public service installations.

Filters are available in various forms depending in part upon the kind of septum in use, whether it is backwashed or not, and, if it is, how. Take, for example, one of the most familiar filters having a tubular filter medium. The fluid to be filtered is directed from the outside into the inside of the filter medium, and the septum is automatically backwashed to cleanse it of cake each time the cake accumulates to a prescribed amount.

Conventionally, the amount of the cake on the filter medium has been determined solely on the basis of a fluid pressure difference across the septum. This practice is objectionable because the pressure difference varies not only with the cake amount but also with the temperature and flow rate of the fluid being filtered. If the fluid changes in temperature or flow rate during the progress of filtration, as is frequently the case, it has become impossible to know the cake amount by relying on the pressure difference only. Then, unless no measure is taken to make the pressure difference independent of variations in fluid temperature and flow rate, the filter medium has been backwashed either prematurely or belatedly.

The applicant is aware of some conventional solutions to this problem. They are all unsatisfactory, however, as will be later discussed in more detail with reference to the drawings attached hereto.

SUMMARY OF THE INVENTION

The present invention solves the problem of how to ascertain the correct moments for backwashing the filter medium on the basis of a pressure difference across the same in the face of possible, and almost unavoidable, variations in the flow rate and temperature of the fluid being filtered.

Briefly stated in one aspect thereof, the invention provides, in a filter, a method of backwashing a filter medium in response to a pressure difference across the same. The method teaches to constantly monitor not only the fluid pressure difference across the filter medium but also at least either, preferably both, of the temperature and flow rate of the fluid. Pressure difference characteristics of the filter at various temperatures and/or flow rates of the fluid, including a pressure difference characteristic at a rated temperature and/or rated flow rate of the fluid, are stored in a suitable memory. A correction coefficient is computed by comparing the pressure difference characteristic at the monitored temperature and/or monitored flow rate of the fluid with the pressure difference characteristic at the rated temperature and/or rated flow rate of the fluid. The monitored pressure difference, which may be at other than the rated temperature and/or rated flow rate, is corrected by the computed correction coefficient. The thus corrected pressure difference is that at the rated temperature and/or flow rate, so that the filter medium is backwashed when it rises to a predetermined value.

Another aspect of the invention concerns a filter constructed for carrying the above summarized method into practice. The filter has a pressure difference meter for measuring the fluid pressure difference across the septum, and at least either, preferably both, of a thermometer for measuring the temperature of the fluid and a flowmeter for measuring its flow rate. A correction coefficient circuit is provided which includes a memory for storing the pressure difference characteristics of the filter at various temperatures and/or flow rates of the fluid including a pressure difference characteristic at a rated temperature and/or rated flow rate of the fluid. Inputting the monitored temperature and/or flow rate of the fluid, the correction coefficient circuit computes a correction coefficient by comparing the pressure difference characteristic at the monitored temperature and/or monitored flow rate with the pressure difference characteristic at the rated temperature and/or rated flow rate of the fluid. A correction circuit is coupled to the pressure difference meter and the correction coefficient circuit for correcting the measured pressure difference by the correction coefficient in order to obtain a pressure difference at the rated temperature and/or rated flow rate of the fluid. Also included are means for backwashing the filter medium when the corrected pressure difference rises to a predetermined value. The filter medium may be backwashed either automatically or by manual actuation.

Thus, according to the invention, the pressure difference measurements at various fluid temperatures and/or flow rates are automatically corrected into those at the rated temperature and/or flow rate. The corrected pressure difference is in exact proportion with the amount of the cake on the filter medium.

Consequently, even if the uncorrected pressure difference measurement warrants the backwashing of the septum, the corrected pressure difference may fall short of the predetermined value. Then filtration will continue until the corrected pressure difference subsequently builds up to the predetermined value. The downtime of the filter can thus be decreased. Also, possibly, the corrected pressure difference may come up to the predetermined value even though the uncorrected measurement may be lower. Then the septum will be backwashed in order to prevent the overloading of the pump by which the fluid is forced through the septum.

Further, if the corrected pressure difference is below a certain value when the flow rate is less than the rating, this fact can be ascribed to the breakage of the filter medium or to fluid leakage through some seals of the filter. The filter may then be immediately set out of operation for repair.

The above and other features and advantages of this invention and the manner of realizing them will become more apparent, and the invention itself will best be understood, from a study of the following description and appended claims, with reference had to the attached drawings showing a preferred embodiment of the invention and the pertinent prior art.

DETAILED DESCRIPTION

Figure 3:
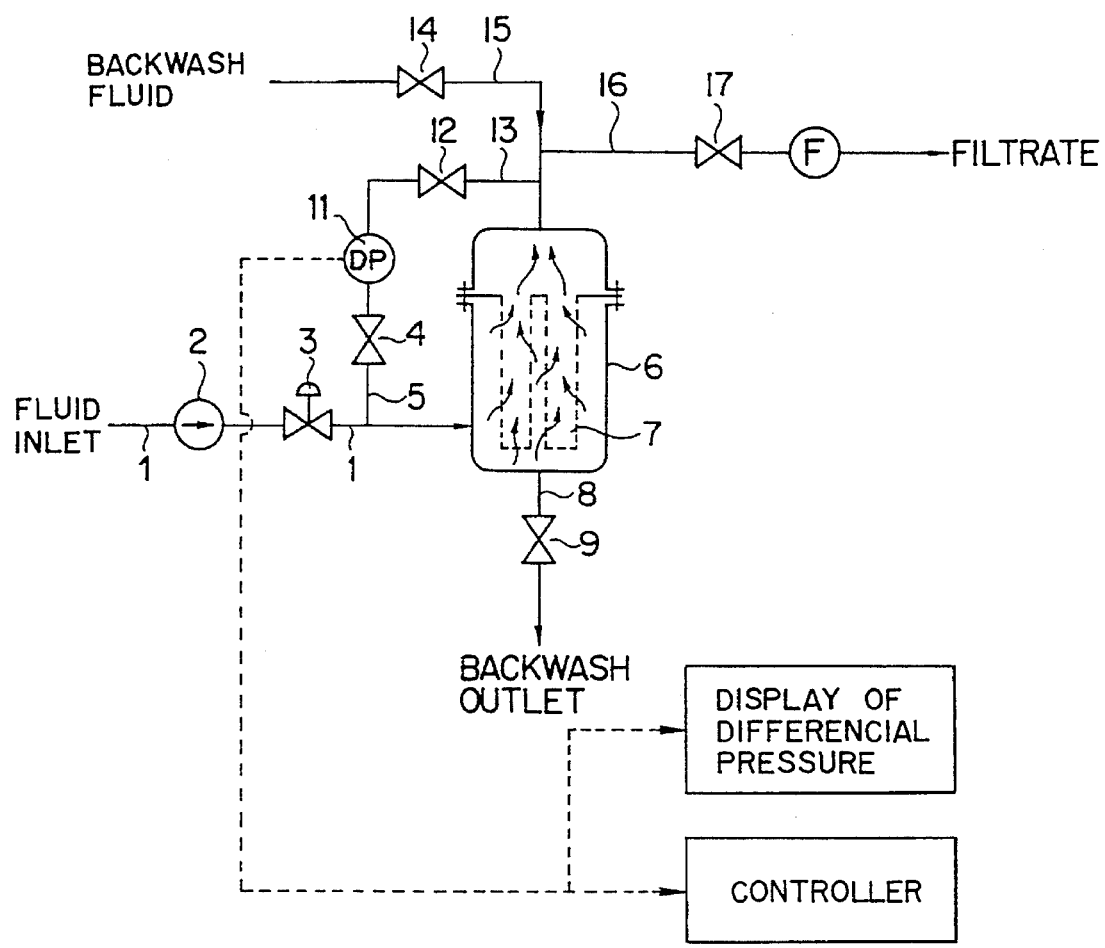
FIG. 3 is a diagrammatic representation of a prior art filter.
Figure 4A:
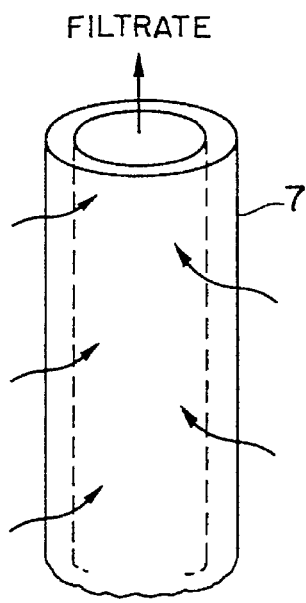
FIG. 4A is a perspective view of one of the tubes of a filter medium in the filters in FIGS. 1 and 3.
Figure 4B:
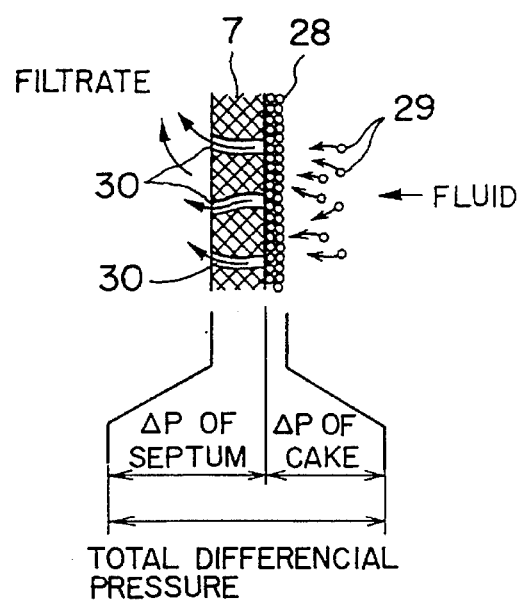
FIG. 4B is an enlarged, fragmentary axial section through the filter tube of FIG. 4A.
Figure 5:
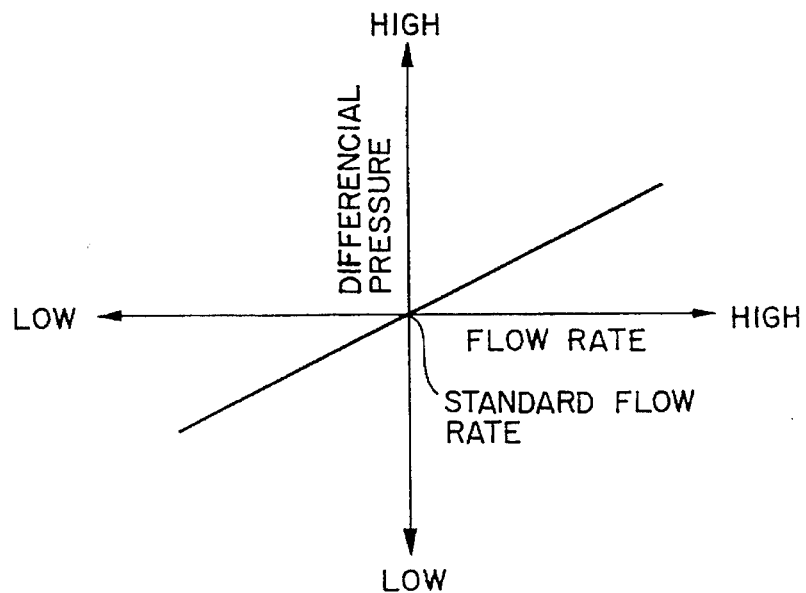
FIG. 5 is a graph showing the relationship between pressure difference and flow rate in filters in general.

The noted inconveniences heretofore encountered in the art will be better understood by referring to FIGS. 3–10 of the above drawings. FIG. 3 shows one typical prior art filter to which the concepts of the present invention are applicable. The fluid to be filtered is forced through an inlet conduit 1 by a pump 2 into a filter vessel 6 at a rate determined by a flow control valve 3. The filter vessel 6 houses a filter medium 7 in the form of a multiplicity of tubes. One of these tubes is illustrated in perspective and on an enlarged scale in FIG. 4A and in a still more enlarged, partial section in FIG. 4B. As the fluid flows through minute pores 30 in the filter medium 7, solids 29 contained therein are thereby caught and accumulate thereon as cake 28. The filtrate flows from the filter vessel 6 into an outlet conduit 16.

The cake 28 on the filter medium 7 will increase in thickness and density with the progress of filtration. The increase in the amount of the cake manifests itself as a an increase in pressure difference across the filter medium 7.

Therefore, for the detection of the amount of the cake, a pressure meter 11 is provided between an upstream conduit 5, in communication with the inlet conduit 1, and a downstream conduit 13 in communication with the outlet conduit 16. With the opening of valves 4 and 12 on the conduits 5 and 13, the pressure difference meter 11 measures the pressure difference between the fluid being pumped toward the filter medium 7 and the filtrate which has passed through the filter medium and the cake 28. The pressure difference signal from the meter 11 is directed into both control 26 and display 27 for the monitoring and control of filtration.

Filtration is suspended by setting the pump 2 out of operation when the pressure difference rises to a prescribed degree. Further a valve 17 on the filtrate outlet conduit 16 is closed, and both a valve 14 on a backwash inlet conduit 15 and a valve 9 on a backwash outlet conduit 8 are opened for forcing compressed air or other backwash fluid into the filter vessel 6. The backwash will force the cake 28 away from the filter medium 7 and with it leave the filter vessel 6 by flowing into the backwash outlet conduit 8. Upon completion of the backwashing of the filter medium 7, the backwash valves 9 and 14 are reclosed, the filtrate outlet valve 17 reopened, and the pump 2 reset into operation for resumption of filtration. The complete process of septum reconditioning will be performed automatically under the direction of the control 26.

The pressure difference across the filter medium 7 is proportional to the frictional pressure loss of the fluid flowing through the septum and the cake 28 thereon. As the cake increases in thickness and density with the progress of filtration, so does the pressure loss of the fluid traversing the cake, giving rise to a corresponding rise in the pressure difference.

In practice, however, it is not so easy as it may seem to determine the moments for backwashing the septum on the basis of the pressure difference. This is because the pressure difference depends not only on the amount of the cake but also on other parameters of the filtration system typically including the flow rate and temperature of the fluid. The flow rate is proportional to the pressure loss. Consequently, being is a measure of the pressure loss of the fluid as aforesaid, the pressure difference is proportional to the flow rate, as graphically represented in FIG. 5.

Figure 6:
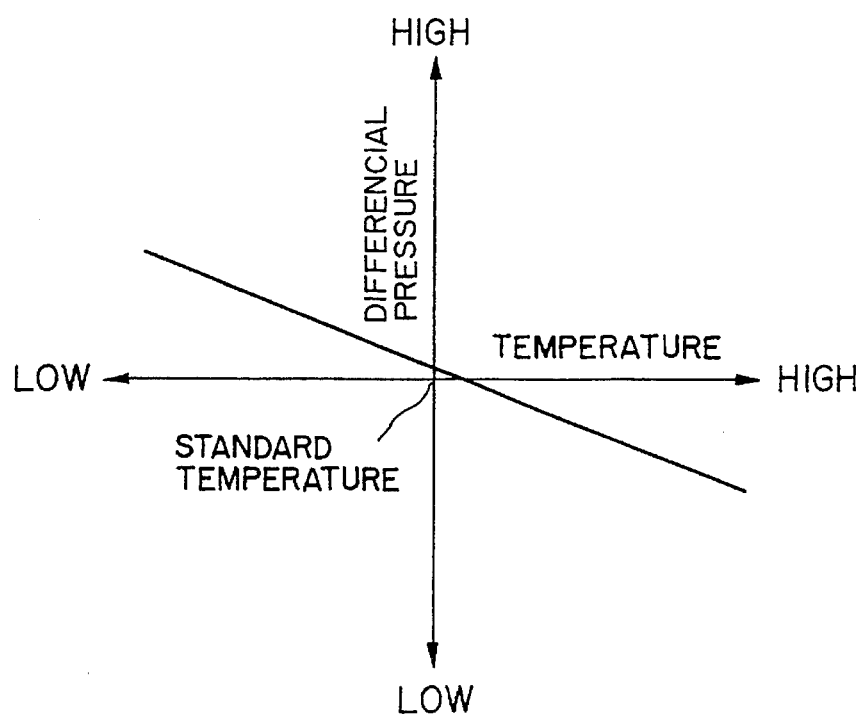
FIG. 6 is a graph showing the relationship between pressure difference and fluid temperature in filters in general.
Figure 7:
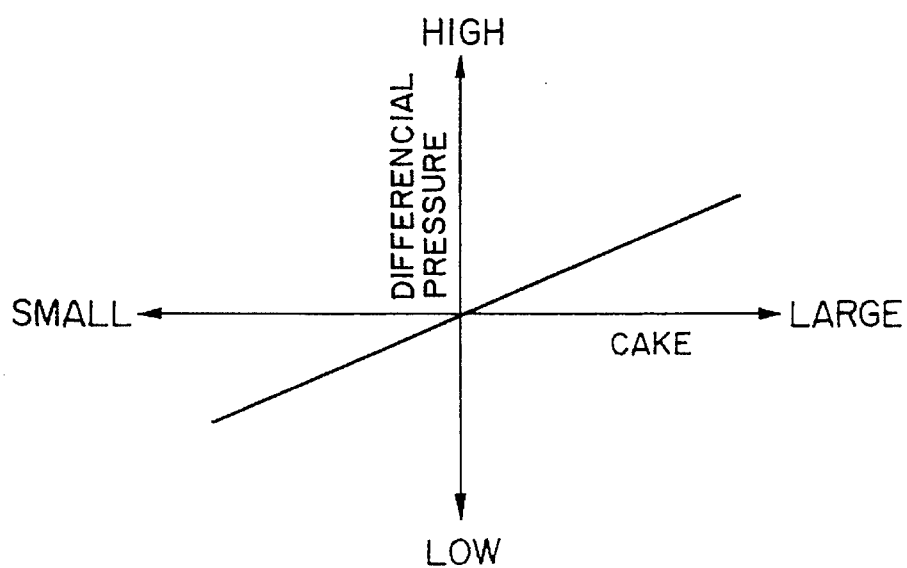
FIG. 7 is a graph showing the relationship between pressure difference and cake amount in filters in general.

The temperature of the fluid, on the other hand, is inversely proportional to its viscosity or fluidity. Accordingly, with an increase in fluid temperature, the viscosity decreases, making it easier for the solids to traverse the septum, with a consequent decrease in pressure difference. FIG. 6 indicates this relationship between fluid temperature and pressure difference. FIG. 7 similarly indicates the noted relationship between the amount of the cake and the pressure difference.

Figure 8:
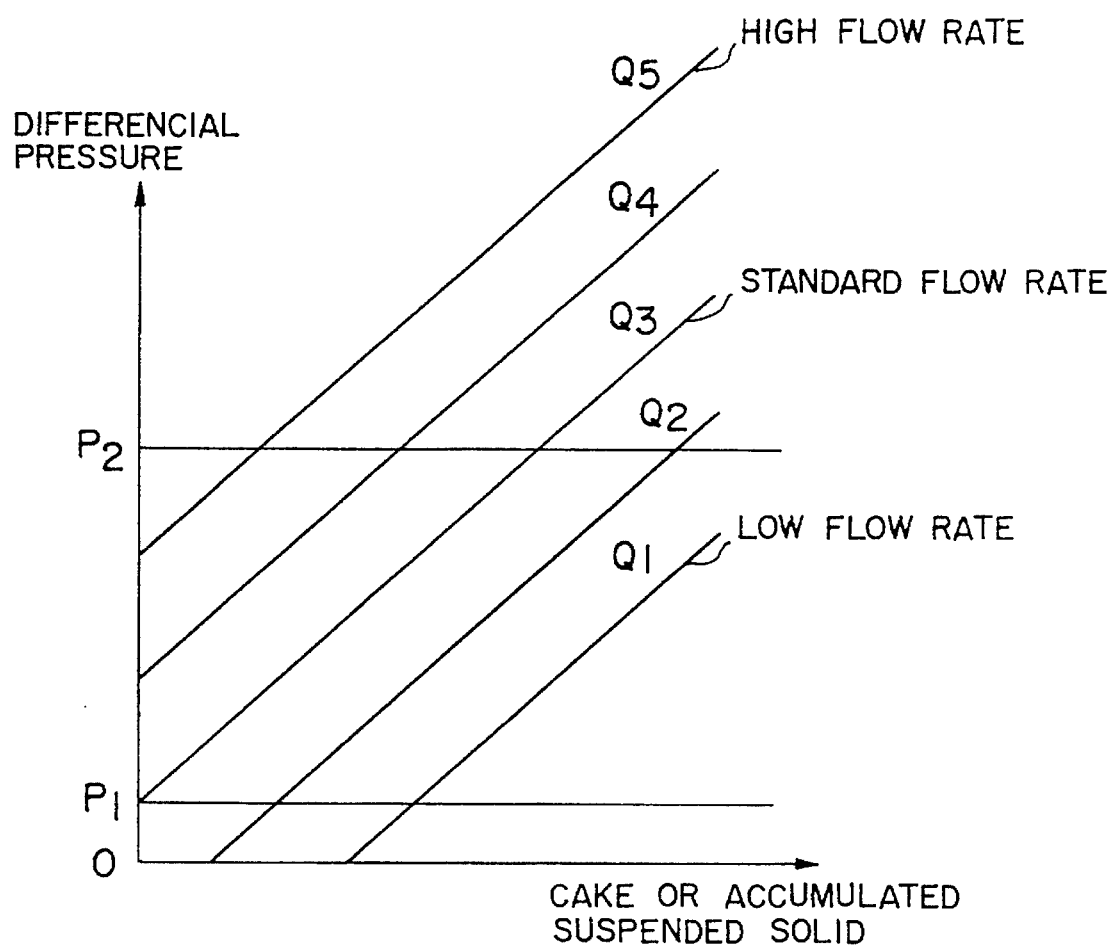
FIG. 8 is a graph showing pressure difference characters of filters in general at different flow rates.

In FIG. 8 are shown the typical pressure difference characteristics of the fluid being pumped into the FIG. 3 filter at various flow rates $Q_1$ through $Q_5$. The flow rate is lowest at $Q_1$ and highest at $Q_5$. The pressure difference has a value $P_1$ when the fluid flowing at a rated flow rate $Q_3$ through the septum with no cake at all formed thereon. The septum may be broken if the pressure difference drops below this value $P_1$ when the fluid is being pumped at the rated flow rate $Q_3$. The septum is to be backwashed when the pressure difference rises to a value $P_2$.

Figure 9:
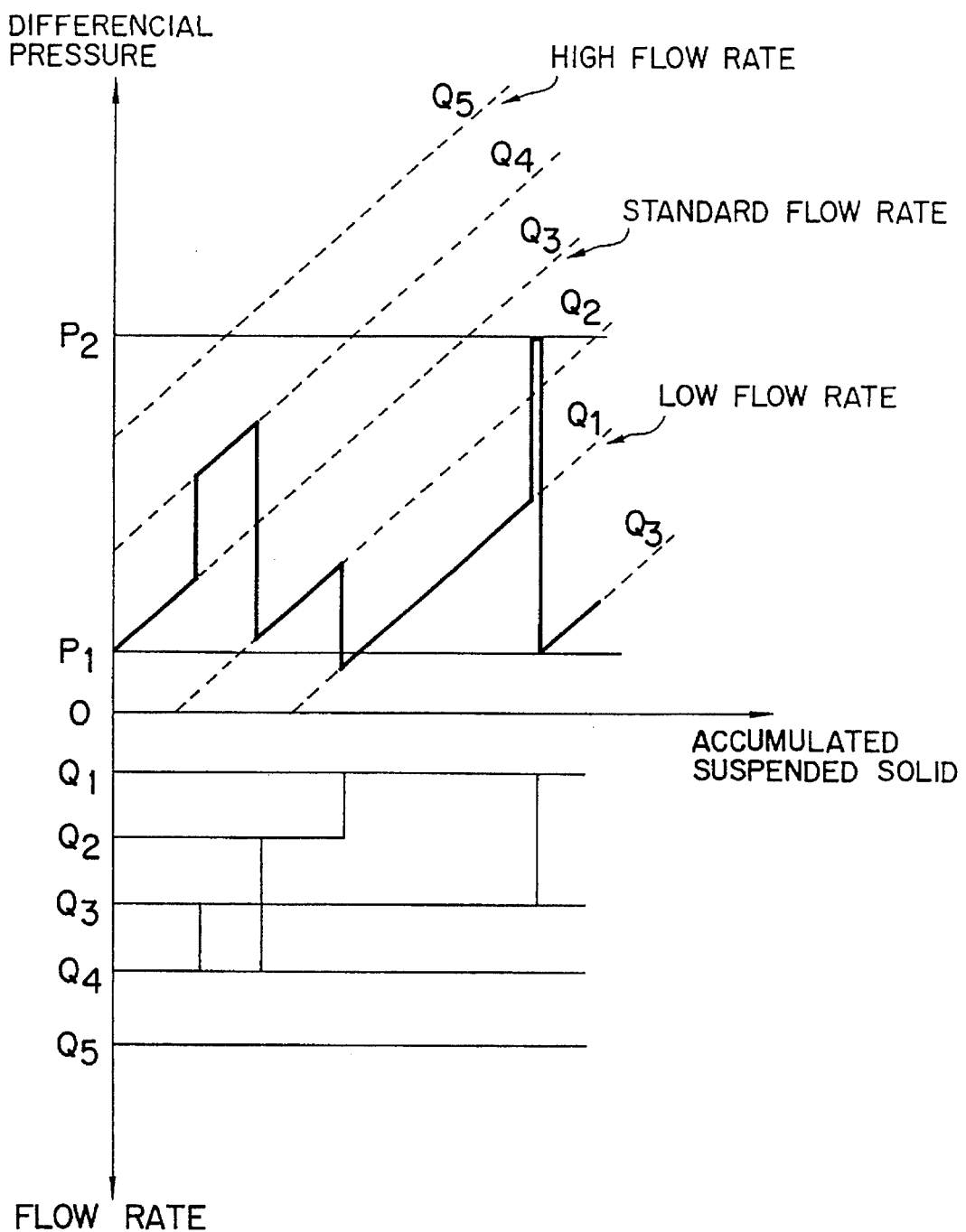
FIG. 9 is a graph explanatory of the operation of the prior art filter of FIG. 3.

It will be seen, then, that the pressure difference changes widely with variations in flow rate. FIG. 9 indicates by the solid line the abrupt changes in pressure difference when the flow rate is varied among the values $Q_1$–$Q_4$ in FIG. 8. Conventionally, therefore, it has been practically impossible to ascertain the exact amount of the cake from the detected pressure difference when the flow rate is changed as in FIG. 9.

Generally, filters should operate under conditions imposed thereon by the host system with which they are incorporated. They should be capable of filtering a fluid at whatever flow rate at which it is discharged by the host system. They are also required to filter the fluid at low temperatures during the startup period of the host system or in winter, and at high temperatures during continuous system operation for any extended time or in summer.

Heretofore, however, filters of the type shown in FIG. 3 have had to operate in a narrowly limited range of flow rates and in a similarly limited temperature range for backwashing the septum at appropriate moments. This is because, as studied above, any undue variations in flow temperature and flow rate ruin the desired proportionality between the pressure difference across the septum and the amount of the cake thereon.

A heat exchanger represents one conventional measure to smooth out the varying temperatures of the fluid discharged by the host system. The use of a heat exchanger is of course objectionable because of the additional installation and running costs required.

Figure 10:
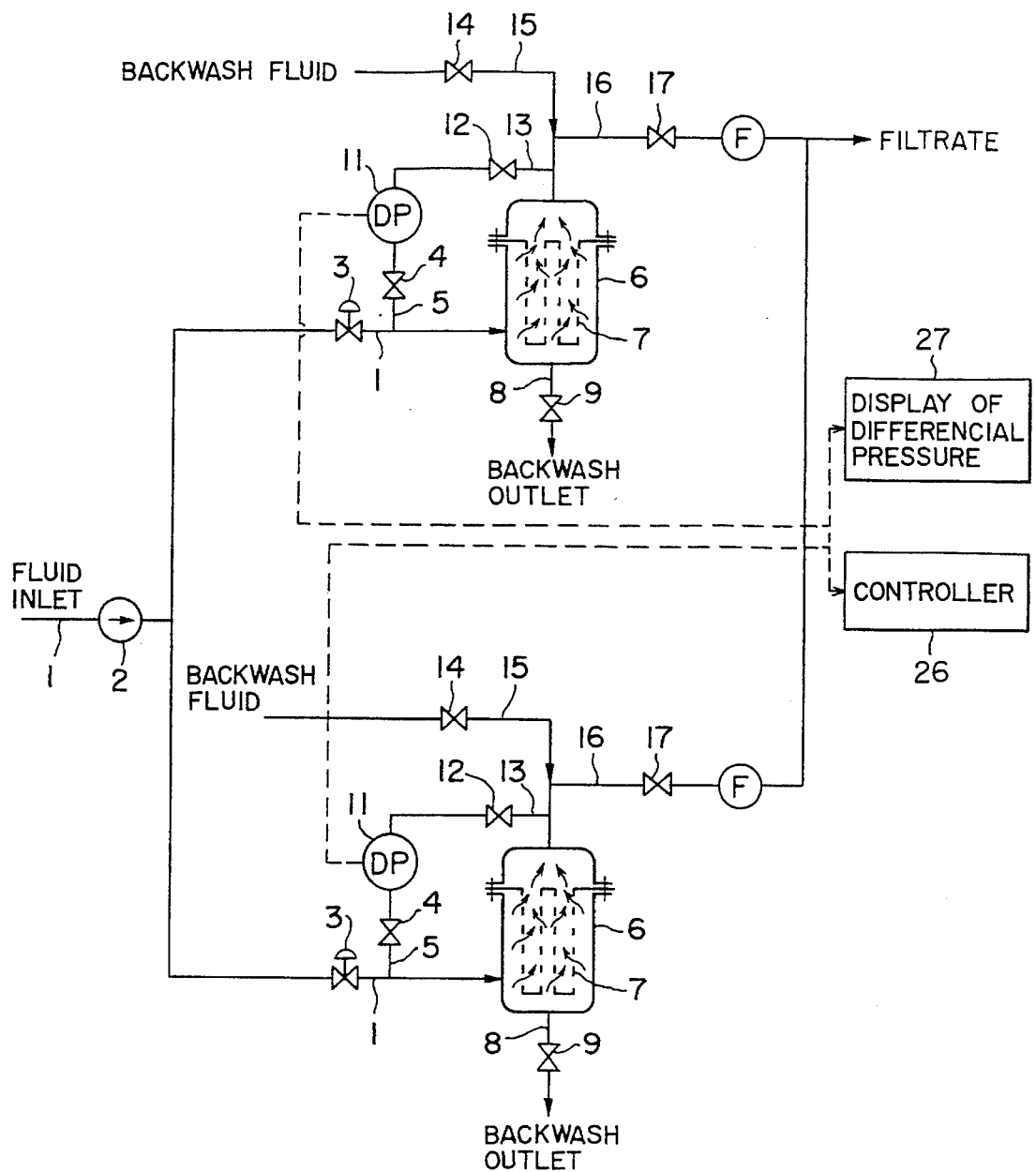
FIG. 10 is a diagrammatic representation of another prior art filter.

In order to make the flow rate constant, on the other hand, the usual practice has been to run the filter intermittently at a rated flow rate even when the host system is discharging the fluid at less than the rating. It has also been known to connect a plurality of filter units, each constructed as in FIG. 3, in parallel with each other, as illustrated in FIG. 10. The filter units have been put to selective operation so that each unit may filter the fluid at a constant flow rate despite the varying flow rate at which the fluid is being discharged by the host system. This solution is also unsatisfactory because not all the filter units are put to constant operation, making the installation cost very high.

Figure 1:
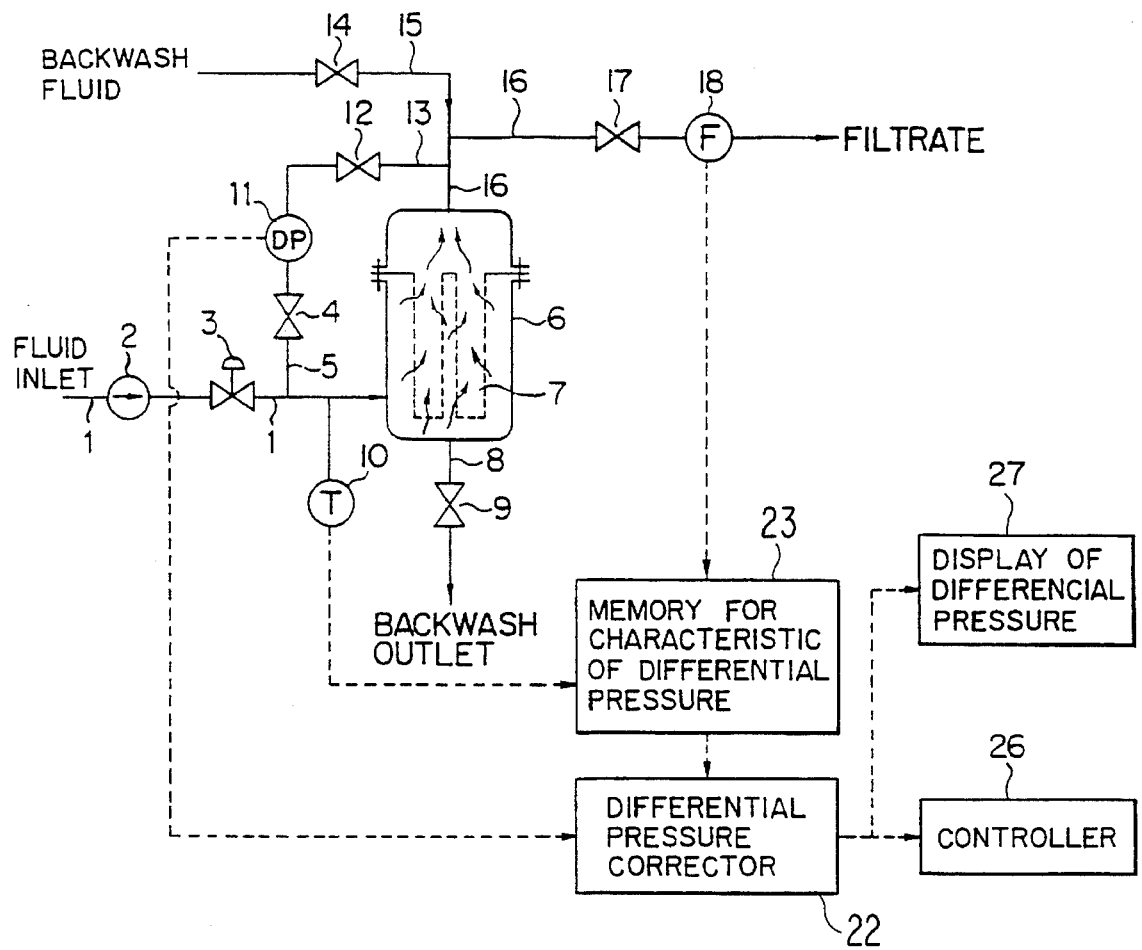
FIG. 1 is a diagrammatic representation of the filter constructed in accordance with the novel concepts of this invention.

The invention will now be described in detail as embodied in the filter shown in FIG. 1. The exemplified filter has a fluid tight filter vessel 6 in which is housed a filter medium 7 in the form of a multiplicity of upstanding tubes each constructed as in FIGS. 4A and 4B. A fluid inlet conduit 1, with a pump 2 and a flow control valve 3 thereon, is coupled to a lower part of the filter vessel 6 for introducing therein a fluid to be filtered. A filtrate outlet conduit 16, with an on-off valve 17 thereon, is coupled to the top of the filter vessel 6 for withdrawing the filtrate therefrom.

For backwashing the filter medium 7 within the filter vessel 6, a backwash inlet conduit 15 having an on off valve 14 communicates with the filtrate outlet conduit 16 at a point upstream of the filtrate outlet valve 17. A backwash outlet conduit 8 with a valve 9 thereon extends from the bottom of the filter vessel 6.

A pressure difference meter 11 measures the pressure difference across the filter medium 7. For such measurement the pressure difference meter 11 communicates with the fluid inlet conduit 1 by way of an upstream conduit 5 and with the filtrate outlet conduit 16 by way of a downstream conduit 13. On-off valves 4 and 12 are provided respectively on the upstream conduit 5 and downstream conduit 13. Comparing the fluid pressures on the upstream and downstream sides of the filter medium 7, the pressure difference meter 11 puts out an electric signal indicative of the difference therebetween.

The filter construction as so far described is conventional and therein lies no features of the invention. The novel features of the invention will appear in the following description.

At 22 is shown a pressure difference correction circuit coupled to the pressure difference meter 11 for inputting the pressure difference signal therefrom. The correction circuit 22 has another input coupled to a correction coefficient circuit 23 for inputting a correction coefficient whereby the pressure difference measurements are corrected and made free from the influences of variations in the temperature and flow rate of the fluid. The corrected pressure difference is supplied to both control 26 and display 27.

For putting out the required correction coefficient the correction coefficient circuit 23 has an input coupled to a thermometer 10 and another input to a flowmeter 18. The thermometer 10 measures the temperature of the fluid flowing through the inlet conduit 1 at a point just upstream of the filter vessel 6, although the fluid temperature could be measured elsewhere such as, for example, within the filter vessel 6 or within the outlet conduit 16. The flowmeter 18 is shown to measure the flow rate of the fluid within the outlet conduit 16.

It is understood that the correction coefficient circuit 23 includes a memory for storing the pressure difference characteristics of the filter at various fluid temperatures and flow rates. Such pressure difference characteristics include those at a rated fluid temperature and rated flow rate.

In operation, the fluid will be pumped through the inlet conduit 1 into the filter vessel 6 at a rate determined by the flow control valve 3. The filtrate that has passed through the filter medium 7, leaving solids thereon, will flow into and through the outlet conduit 16 for discharge or to any subsequent processing station.

Cake will collect on the filter medium 7 with the progress of filtration, causing a gradual increase in fluid pressure difference across the septum. This pressure difference is constantly measured by the meter 11. Also, the temperature and flow rate of the fluid are constantly monitored by the thermometer 10 and flowmeter 18.

Inputting the temperature and flow rate measurements, the correction coefficient circuit 23 will computes the correction coefficient by comparing the stored pressure difference characteristics at the measured temperature and flow rate with the stored pressure difference characteristics at the rated temperature and flow rate. The computed correction coefficient will be supplied to the correction circuit 22, which also inputs the pressure difference signal from the meter 11. The correction circuit will correct the pressure difference measurements by the correction coefficient and put out the correct pressure difference at the rated temperature and flow rate, for delivery to both control 26 and display 27.

The filter medium 7 may be backwashed when the corrected pressure difference rises to a predetermined value. To this end the pump 2 may be set out of operation, the filtrate outlet valve 17 closed, and the backwash valves 14 and 9 opened. Backwashed by a suitable fluid under pressure, the filter medium 7 will become clean of the cake. The cake will be discharged from the filter vessel 6 through the outlet conduit 8. Then the backwash valves 9 and 14 may be reclosed, the filtrate outlet valve 17 reopened, and the pump 2 reset into operation for another cycle of filtration.

Such backwashing of the septum may be done either automatically, under the direction of the control 26, or by manual control of the pump and the required valves when the display 27 exhibits the predetermined pressure difference.

Figure 2:
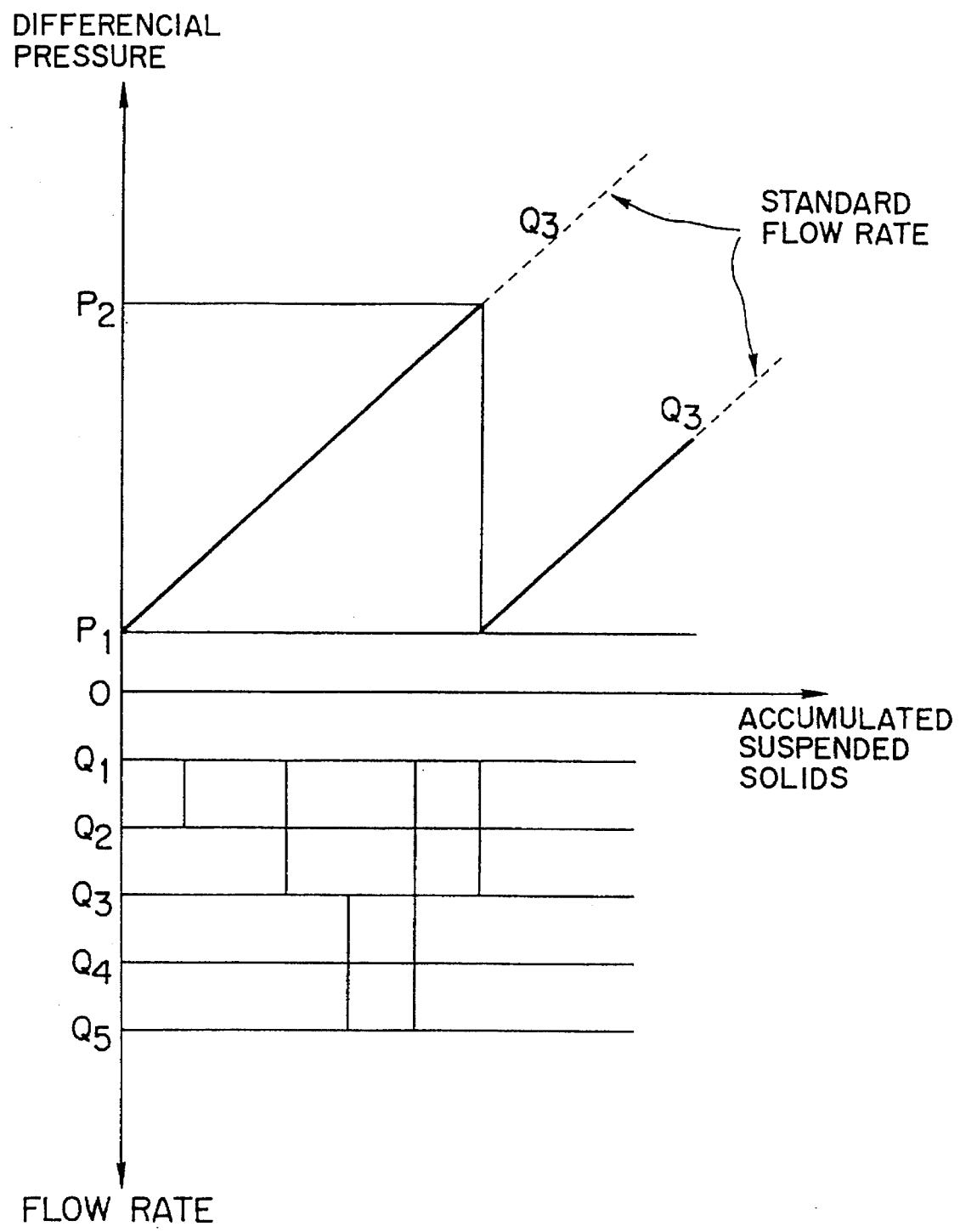
FIG. 2 is a graph explanatory of the operation of the filter of FIG. 1.

FIG. 2 graphically represents the corrected pressure difference curve according to the invention when the fluid is filtered at various flow rates. It will be appreciated that the pressure difference is in exact proportion with the amount of the cake even though the flow rate deviates widely from the rating $Q_3$ to the lowest $Q_1$ and the highest $Q_5$.

Despite the foregoing detailed disclosure, it is not desired that the present invention be limited by the exact details of the illustrated embodiment or of the description thereof. A variety of modifications, alterations or adaptations of this disclosure may be resorted to in order to conform to design preferences or to the requirements of each specific application of the invention, without departure from the scope of the following claims.

What is claimed is:

1. In a filter, a method of backwashing a filter medium in response to a pressure difference across the same, which comprises:

(a) constantly monitoring a pressure difference, across a filter medium of a fluid being filtered by constantly monitoring a pressure difference between fluid entering the filter medium on an upstream side of the filter medium and fluid which has passed through the filter medium on a downstream side of the filter medium;

(b) constantly monitoring the temperature and flow rate of the fluid;

(c) memorizing pressure difference characteristics of the filter at various temperatures and flow rates of the fluid including a pressure difference characteristic at a rated temperature and rated flow rate of the fluid;

(d) computing a correction coefficient by comparing the pressure difference characteristic at the monitored temperature and monitored flow rate of the fluid with the pressure difference characteristic at the rated temperature and rated flow rate of the fluid;

(e) correcting the monitored pressure difference by the correction coefficient in order to obtain a corrected pressure difference at the rated temperature and rated flow rate of the fluid; and (f) backwashing the filter medium when the corrected pressure difference rises to a set value.

2. The method of backwashing of claim 1, wherein the filter medium is a filter medium for filtering a liquid, and the fluid is a liquid.

3. A filter comprising:

(a) a filter medium for filtering a fluid under pressure;

(b) a pressure difference meter for measuring a pressure difference of the fluid across the filter medium, said pressure difference meter coupled for measuring a pressure difference between fluid entering the filter medium on an upstream side of the filter medium and fluid which has passed through the filter medium on a downstream side of the filter medium;

(c) monitoring means for monitoring the temperature and flow rate of the fluid;

(d) correction coefficient circuit means for storing pressure difference characteristics of the filter at various temperatures and flow rates of the fluid including a pressure difference characteristic at a rated temperature and rated flow rate of the fluid, the correction coefficient circuit means being coupled to the monitoring means for computing a correction coefficient by comparing the pressure difference characteristic at the monitored temperature and monitored flow rate of the fluid with the pressure difference characteristic at the rated temperature and rated flow rate of the fluid;

(e) correction circuit means coupled to the pressure difference meter and the correction coefficient circuit means for correcting the measured pressure difference by the correction coefficient in order to obtain a corrected pressure difference at the rated temperature and rated flow rate of the fluid; and (f) means for backwashing the filter medium when the corrected pressure difference rises to a set value.

4. The filter of claim 3, wherein the filter medium is a filter medium for filtering a liquid, and the fluid is a liquid.

5. A filter comprising:

(a) a filter medium for filtering a fluid under pressure;

(b) a pressure difference meter for measuring a pressure difference of the fluid across the filter medium, said pressure difference meter coupled for measuring a pressure difference between fluid entering the filter medium on an upstream side of the filter medium and fluid which has passed through the filter medium on a downstream side of the filter medium;

(c) a flow meter for measuring the flow rate of the fluid;

(d) a thermometer for measuring the temperature of the fluid;

(e) correction coefficient circuit means for storing pressure difference characteristics of the filter at various temperatures and flow rates of the fluid including a pressure difference characteristic at a rated temperature and rated flow rate of the fluid, the correction coefficient circuit means being coupled to the flow meter and the thermometer for computing a correction coefficient by comparing the pressure difference characteristic at the measured temperature and measured flow rate of the fluid with the pressure difference characteristic at the rated temperature and rated flow rate of the fluid;

(f) correction circuit means coupled to the pressure difference meter and the correction coefficient circuit means for correcting the measured pressure difference by the correction coefficient in order to obtain a corrected pressure difference at the rated temperature and rated flow rate of the fluid; and (g) means for backwashing the filter medium when the corrected pressure difference rises to a set value.

6. The filter of claim 5 comprising a control coupled to the correction circuit means for automatically actuating the backwashing means when the corrected pressure difference rises to a predetermined value.

7. The filter of claim 5 further comprising a display coupled to the correction circuit means for visually representing the corrected pressure difference.

8. The filter of claim 5, wherein the filter medium is a filter medium for filtering a liquid, and the fluid is a liquid.

* * * * *